Dec. 2, 1924.
L. CHARBONNEAU
1,517,954
AUTOMOBILE VISOR AND AUXILIARY SHIELD
Filed Aug. 21, 1923   3 Sheets-Sheet 3
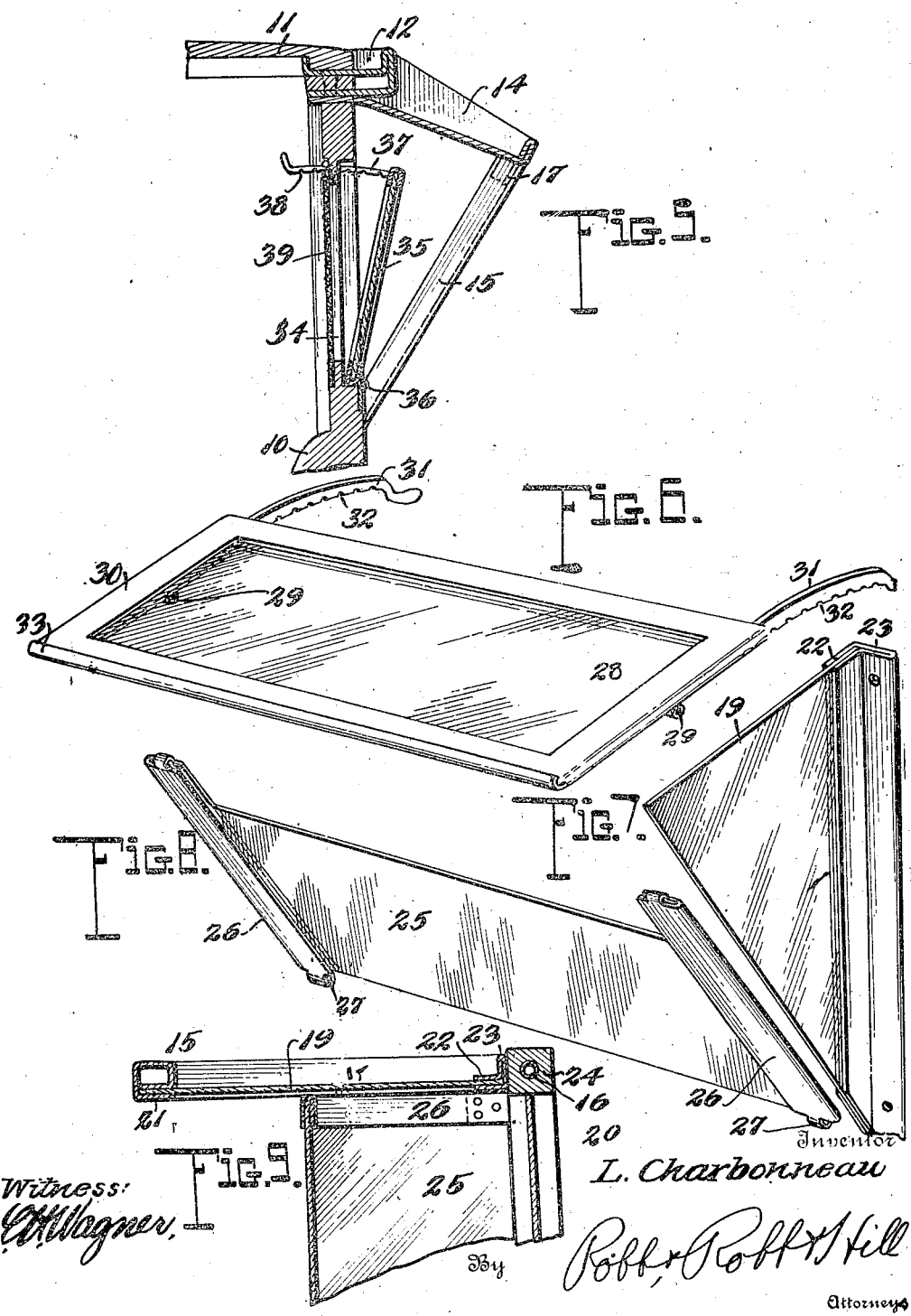

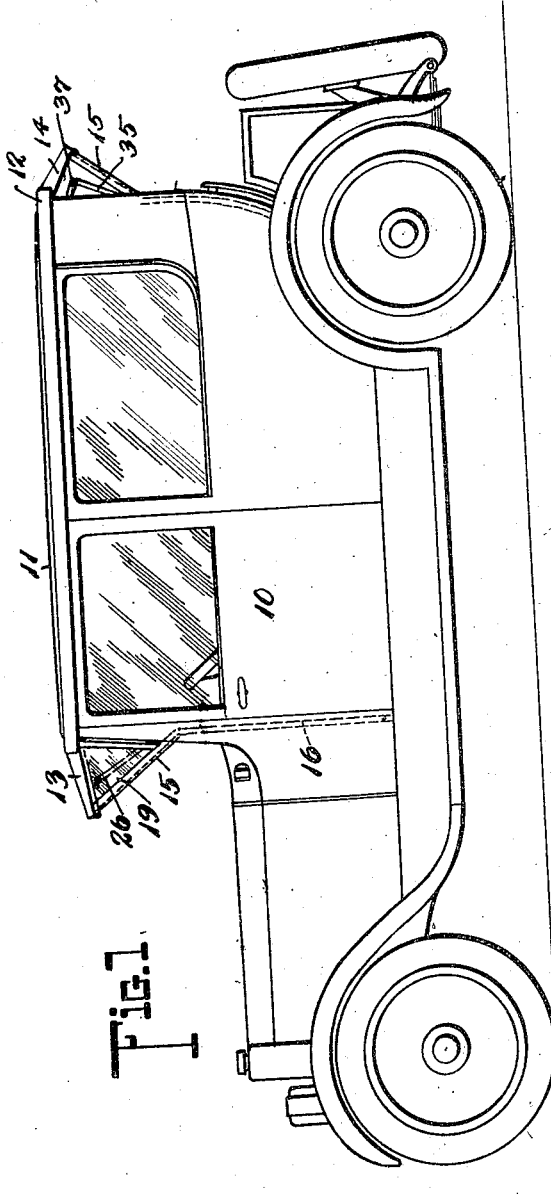

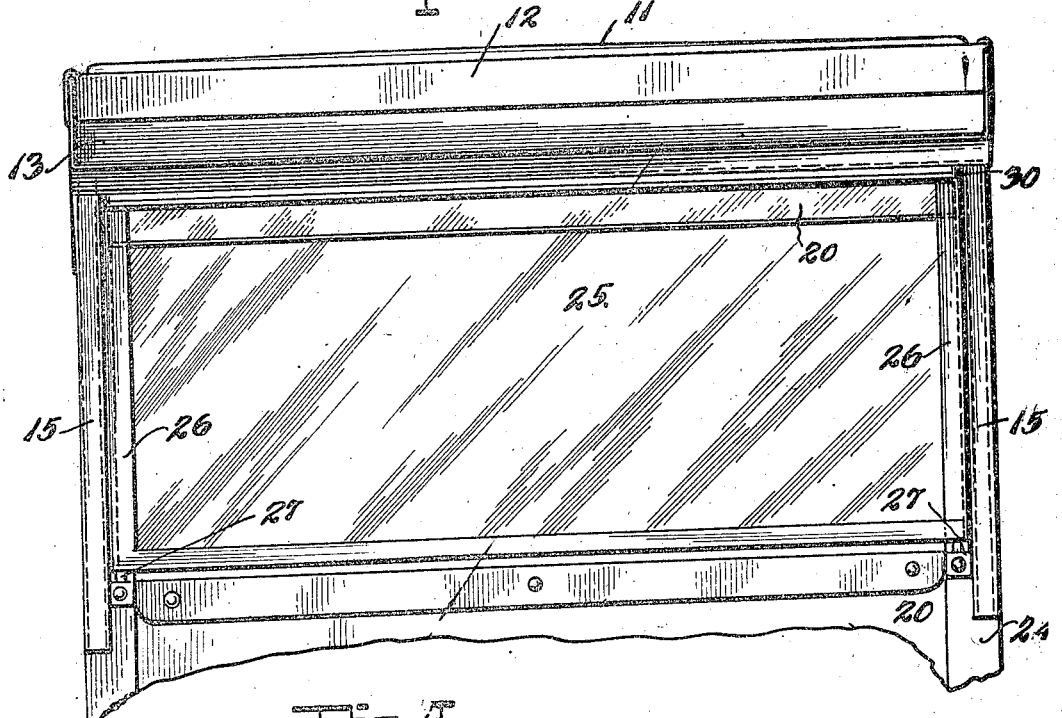
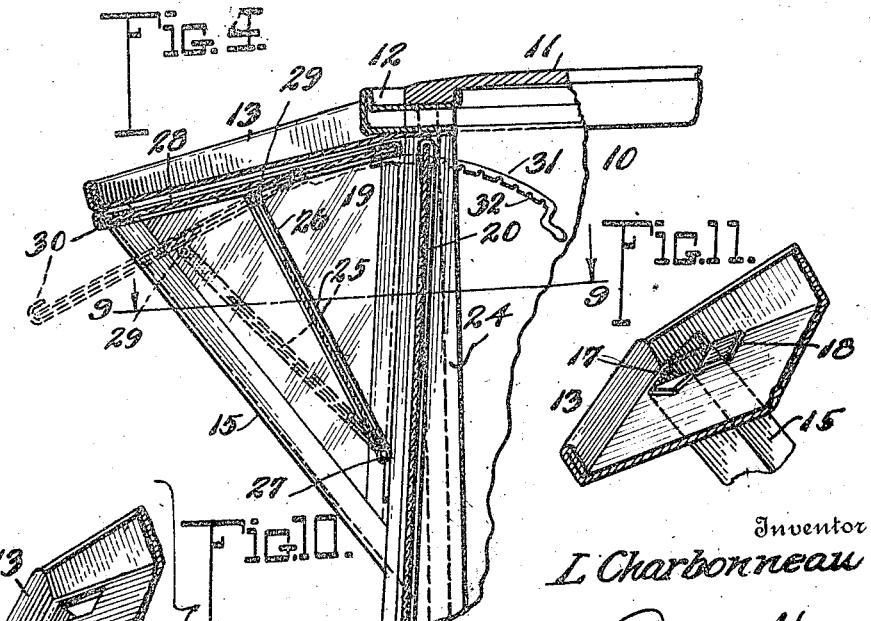

Patented Dec. 2, 1924.

1,517,954

UNITED STATES PATENT OFFICE.

LEONARD CHARBONNEAU, OF OGDENSBURG, NEW YORK.

AUTOMOBILE VISOR AND AUXILIARY SHIELD.

Application filed August 21, 1923. Serial No. 658,585.

*To all whom it may concern:*

Be it known that I, LEONARD CHARBONNEAU, a citizen of the United States, residing at Ogdensburg, in the county of St. Lawrence and State of New York, have invented certain new and useful Improvements in Automobile Visors and Auxiliary Shields, of which the following is a specification.

This invention relates to an automobile visor and auxiliary shield, and particularly to a construction of fixed visor having braces extending from its free edge to the car body and supporting a transparent panel at each side of the windshield, in connection with a cooperating auxiliary shield mounted for adjustment relative to the visor and windshield.

In my prior Patent No. 1,415,794 dated May 2, 1922, the visor or protective device was adjustable in its relation to the drain pipe but it has been found desirable to fixedly mount this device and form thereby a frame to receive a side panel and also to provide a transparent adjustable visor cooperatively connected to a movable auxiliary shield so as to be shifted into a position in the line of vision above said auxiliary shield.

The invention has for an object to provide a novel and improved construction of fixed visor having diagonal supporting braces at its free edge designed to form drainage conduits therefrom, and transparent panels mounted upon said braces to protect the windshield at opposite sides thereof.

A further object of the invention is to provide an improved construction of auxiliary shield pivoted at its lower edge to swing toward and from the vehicle and having means extended within the vehicle for its adjustment and retention relative thereto.

Another object of the invention is to present a novel construction of auxiliary shield pivotally mounted at its lower edge and also pivoted to the horizontally movable visor intermediate the ends thereof so that said visor may be extended forwardly to change its relation to a clear vision space above the transparent body of the auxiliary shield.

Other and further objects and advantages of the invention will be hereinafter set forth and the novel features thereof defined by the appended claims.

In the drawings:—

Figure 1 is a side elevation of a vehicle having the invention applied thereto;

Figure 2 is a similar view upon enlarged scale with the front and rear portions in section;

Figure 3 is a front elevation of the auxiliary shield and associated parts;

Figure 4 is a central vertical section therethrough;

Figure 5 is a similar section through the rear window of the vehicle;

Figure 6 is a detailed perspective of the movable visor;

Figure 7 is a similar view of the side panel;

Figure 8 is a like view of the auxiliary shield;

Figur 9 is a detailed section on the line 9—9 of Figure 4;

Figure 10 is a detailed perspective of the fixed visor and conduit therefrom before assemblage; and Figure 11 is a similar view of the parts assembled.

Like numerals refer to like parts throughout the several figures of the drawing.

The invention is adapted for application to any type of motor vehicle body and for the purpose of illustration is here shown as applied to a body 10 of closed construction, the roof 11 of which is disposed to discharge into a surrounding conducting channel 12 which also drains into the fixed visor 13 at the front and a similar visor 14 at the rear. This fixed visor is supported at its free edge by braces 15 at opposite sides of the vehicle and these braces may comprise conducting conduits communicating with a drain passage 16 in the body of the vehicle frame, as more fully disclosed in my former patent before mentioned. These braces may be connected with the visor in any preferred manner, for instance as shown in Figures 10 and 11. The visor is provided with a depending lip 17 and the upper end of the brace 15 is formed with flanges 18 adapted to be bent outwardly to connect the parts as indicated in Figure 11. This visor and its supporting braces forms a frame to support a transparent panel 19 at each side of the main windshield 20 of the vehicle. These panels may be secured in position in any desired manner, for instance by being slipped in a channel 21 formed in the braces 15 and in a similar channel 22 formed upon an angle plate 23 mounted upon the post or standard 24 of the vehicle.

The auxiliary shield 25, formed of transparent material, is carried by the opposite arms 26 pivotally mounted at their lower ends 27 upon the standards 24 and the transparent body of this shield extends for only a portion of the length of the arms, leaving an open space above the body for clear vision. Disposed above this auxiliary shield is a movable visor member 28 secured to the arms by means of pivots 29 intermediate of its ends and adapted to swing in an arc closely adjacent the fixed visor when in raised position. For the purpose of operating the frame 30 carrying this visor the adjusting members 31 are extended therefrom so as to enter the body of the vehicle and are provided with suitable retaining means such as the notches 32, while the free edge of the frame is formed with a gutter 33 to prevent the dripping of water therefrom.

The window 34 at the rear of the vehicle is provided with a fixed visor and braces before described, as shown in Figures 2 and 5 and also with a shield member 35 of transparent character pivotally mounted at its lower end 36 and provided with an adjusting arm 37 extending within the vehicle and having retaining means 38 for determining the angle of adjustment of this shield relative to the window. This window may if desired be supplied with a screen 39 to prevent the entrance of insects. It will be observed that the use of the shield pivoted at the lower edge of the rear window permits the passage of air through the car body so as to secure perfect ventilation, and may be so adjusted as to prevent direct or strong drafts, while the entrance of moisture in case of rain or storm is prevented by the rear visor disposed to cover the shield in any of its open positions. The shield also through its inclination prevents the entrance of dust thrown by the rear wheels as the natural draft of air through the window carries the dust outward and downward away from the car because the air is directed upward by the shield against the fixed visor and thence downward and rearwardly therefrom.

The operation of the invention will be apparent from the foregoing description and it will be seen that the combination of the auxiliary shield and its visor with the fixed visor having the side panels completely encloses the portion of the windshield in the line of vision of the operator, permitting the same to be opened if desired and when the parts are in the full line position of Figure 4 the space above the body of the auxiliary shield provides for a clear vision while when shifted to the dotted line position the transparent movable visor descends so as to cover and protect the open portion above the plate of the auxiliary shield. This prevents driving of snow or rain against either of the shields at the line of vision.

The movable visor is also adapted to be moved into projected position to screen the open portion of the auxiliary shield against excessive sunlight or the glare of an approaching vehicle, and may be instantly operated by the extended handle for that purpose. When the parts are in their normal position this auxiliary visor is snugly nested beneath the fixed visor and the parts do not obstruct the ordinary view of the driver through the usual windshield.

While the details of construction have been specifically shown and described, still changes and alterations may be made therein without departing from the spirit of the invention as defined by the appended claims.

Having thus described my invention, what I claim as new and desire to secure by Letters Patent is:—

1. In a device of the class described, a downwardly inclined visor, a shield member pivoted to swing outwardly beneath said visor, and a movable visor mounted upon the upper portion of the shield member for simultaneous adjustment therewith.

2. In a device of the class described, a downwardly inclined fixed visor, a shield member pivoted at its lower edge to swing outwardly beneath said visor and carrying a movable visor pivoted to the shield intermediate its front and rear edges, braces extending from the free end of said visor to the vehicle body, and transparent panels supported by said braces at opposite sides of the vehicle.

3. In a device of the class described, an inclined fixed visor, fixed braces extending from the free end of said visor to drain pipes upon the vehicle and comprising a conduit connection from the visor, and transparent panels supported by said braces to enclose the sides beneath said visor.

4. In a device of the class described, an auxiliary transparent shield pivoted at its lower edge, and a movable visor pivoted to said shield at an angle thereto intermediate its front and rear edges and bodily movable therewith toward and from a windshield.

5. In a device of the class described, an auxiliary shield pivoted at its lower edge, a movable visor pivoted to said shield intermediate the front and rear edges of the visor, and an operating arm extending from said visor within the body of the vehicle.

6. In a device of the class described, a shield member comprising opposite frames pivoted at their lower ends, a transparent plate extending for a portion of the length of said frames to provide an unobstructed area above said plate, and a visor member pivoted to said frames beyond said area and adapted to swing bodily with the shield to protect the open portion of said shield.

7. In a device of the class described, a downwardly inclined fixed visor, a movable transparent visor adapted to lie parallel therewith when in closed position, and an auxiliary shield pivotally connected to the vehicle frame and said transparent visor.

8. In a device of the class described, a body portion provided with a windshield, transparent panels at the opposite sides of said shield, and an auxiliary shield comprising a vertically disposed pivoted shield and a horizontally disposed visor member pivoted at the upper portion thereof to bodily swing toward and from the windshield in different paths of travel.

In testimony whereof I affix my signature.

LEONARD CHARBONNEAU.